March 5, 1968 — S. C. SCHAEFFER — 3,371,831
LUGGAGE CARRIER

Filed Nov. 25, 1966 — 3 Sheets-Sheet 1

INVENTOR.
STANLEY C. SCHAEFFER
BY
Merchant & Gould
ATTORNEYS

March 5, 1968    S. C. SCHAEFFER    3,371,831
LUGGAGE CARRIER
Filed Nov. 25, 1966    3 Sheets-Sheet 2
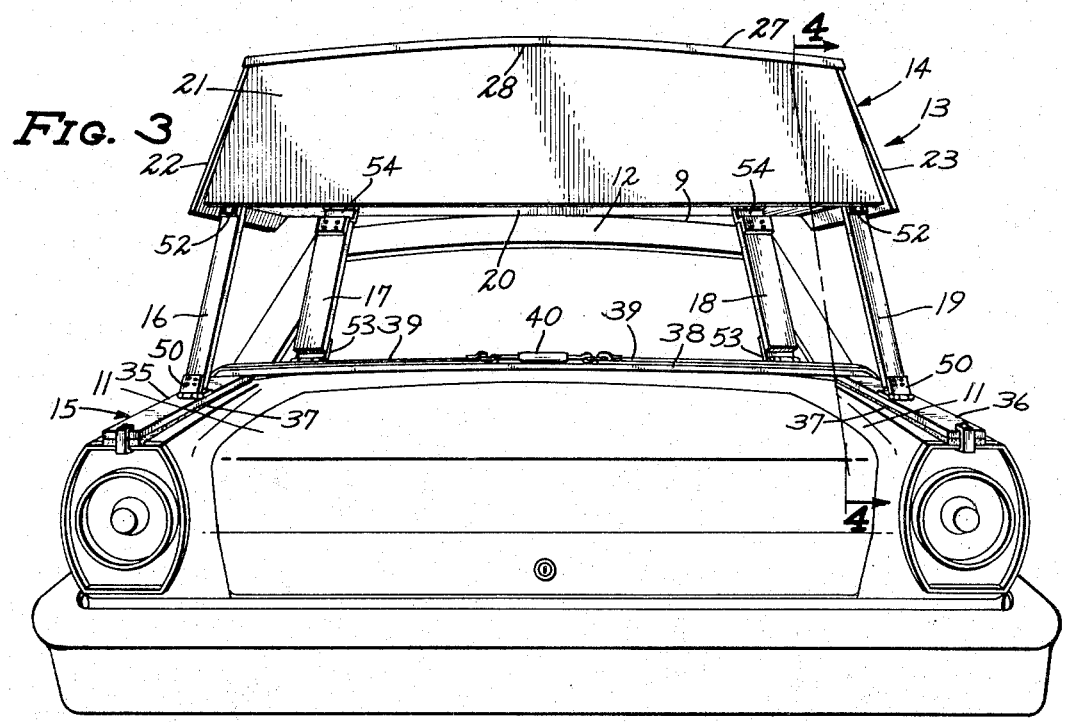
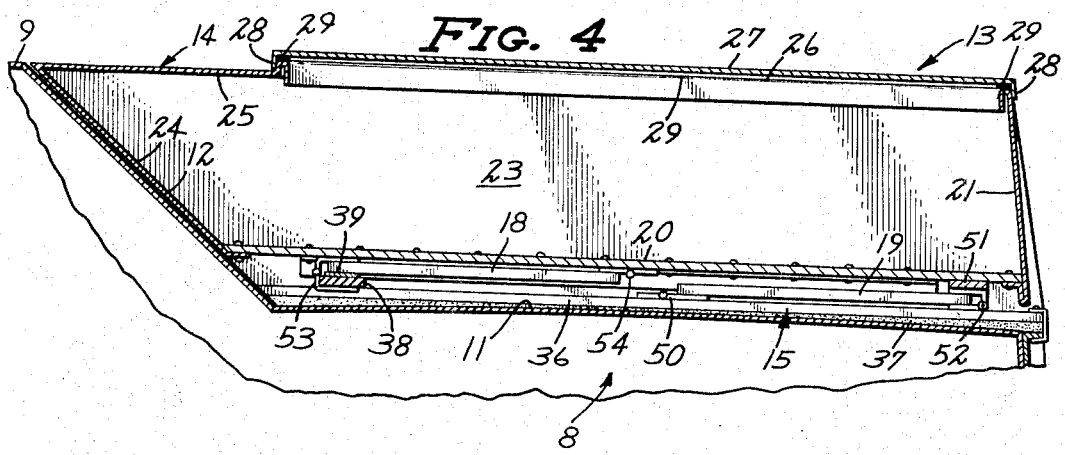
INVENTOR.
STANLEY C. SCHAEFFER
BY
Merchant & Gould
ATTORNEYS

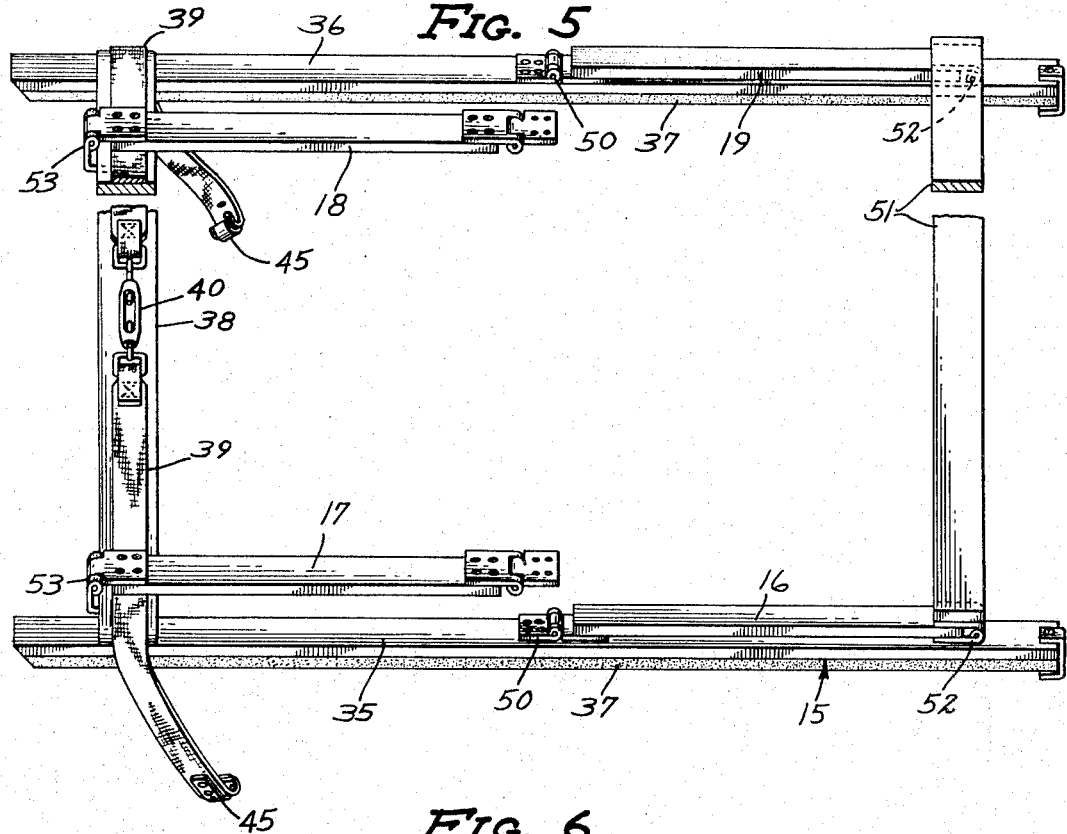
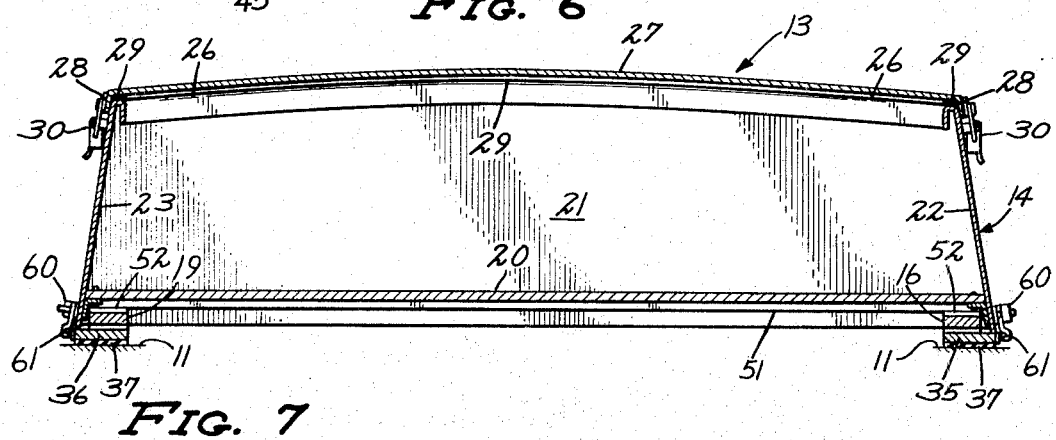
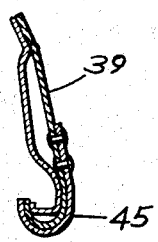

ABSTRACT OF THE DISCLOSURE

The specification discloses a box-like luggage carrier adapted to be attached in overlying relationship on the rear deck of an automobile or the like and capable of being swung upwardly on a plurality of arms to allow access to the trunk.

---

This invention pertains specifically to a luggage carrier for automobiles and the like having a box-like housing shaped to fit on the rear of an automobile in overlying relationship to the rear deck and the inclined rear portion of the roof and mounted thereon by a frame having a plurality of arms, each having one end pivotally attached to the frame and the other end pivotally attached to the housing, to provide the housing with two positions, one of which is the normal position wherein the housing overlies the rear deck in juxtaposition thereto and the other of which is a second position in which the housing is swung upwardly to partially overlie the roof and allow access to the trunk beneath the rear deck portion of the automobile.

It is an object of the present invention to provide a new and improved luggage carrier for automobiles and the like.

It is a further object of the present invention to provide a luggage carrier for automobiles and the like which is attached to the automobile so as to cause a minimum wind resistance while the automobile is in motion.

It is a further object of the present invention to provide a luggage carrier for automobiles and the like which is adapted to overlie the rear portion of an automobile and may be swung upwardly to allow access to the trunk located beneath the rear deck portion of the automobile.

It is a further object of the present invention to provide a luggage carrier for automobiles and the like having a compartment therein with an access opening covered by a watertight cover.

It is a further object of the present invention to provide a luggage carrier for automobiles and the like which is quickly and easily attachable to an automobile, which provides easy access thereto and which is simple to operate and inexpensive to manufacture.

These and other objects of this invention will become apparent to those skilled in the art upon consideration of the accompanying specification, claims, and drawings.

Referring to the drawings, wherein like characters indicate like parts throughout the figures:

FIGURE 3 is a view in perspective, looking from the rear thereof, of the present apparatus in the upper position;

FIGURE 4 is an enlarged sectional view as seen generally from the line 4—4 in FIGURE 3, with the apparatus rotated downwardly to its normal position;

FIGURE 5 is an enlarged view in perspective of the frame work and attached arms with the housing removed therefrom;

FIGURE 6 is an enlarged sectional view as seen from the line 6—6 in FIGURE 1; and FIGURE 7 is an enlarged sectional view as seen from the line 7—7 in FIGURE 1.

Figure 1:
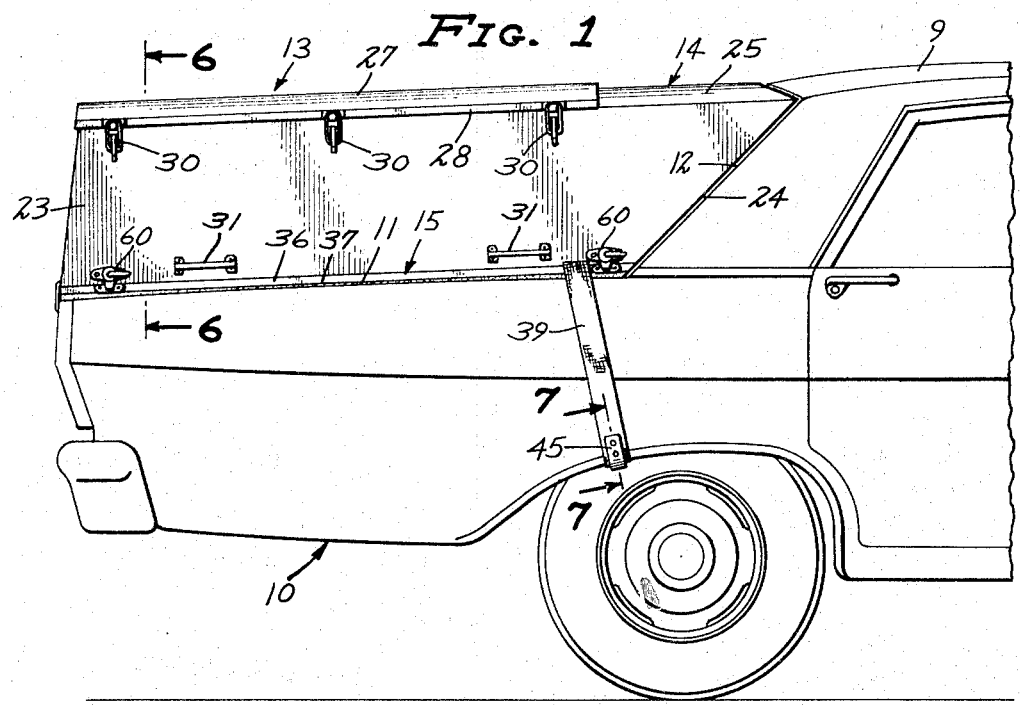
FIGURE 1 is a view in side elevation of the present apparatus attached to an automobile.

In the figures the numeral 10 generally designates an automobile having a rear deck portion 11 with a trunk 8 thereunder. The automobile 10 also has a roof 9 with a slanted portion 12 which is inclined downwardly to join the rear deck portion 11. A luggage carrier generally designated 13 and comprised of an article supporting structure, which may be a platform or a box-like structure such as housing 14, a frame 15, and a plurality of arms 16 through 19, is mounted on the automobile 10 in a manner to be described presently.

The housing 14 has a lower wall 20 adapted to overlie the rear deck portion 11 of the housing 14, a rear wall 21, two side walls 22 and 23, a front wall 24 and an upper wall 25. The rear wall 21 is substantially perpendicular and the side walls 22 and 23 are slanted inwardly to follow the curvature of the automobile 10 to prevent protrusions and the consequent air resistance and unbalance of the automobile 10. The front wall 24 of the housing 14 is formed to extend substantially parallel to and in juxtaposition to the inclined portion 12 of the roof 9 when the lower wall 20 is in overlying relationship with the rear deck portion 11. The upper wall 25 has an opening therethrough for access into the chamber formed by the walls 20 through 25. The opening through the upper wall 25 is substantially rectangular and includes most of the upper wall 25 for ease in packing luggage or the like within the housing 14. The opening in the upper wall 25 has an upwardly extending lip 26 around the periphery thereof. A cover 27, adapted to fit over the opening in the upper wall 25 has a downwardly extending lip 28 around the outer edge thereof and a resilient gasket 29 fixedly attached to the undersurface of the cover 27 adjacent the lip 28. The size of the cover 27 is such that the lip 26 around the opening in the upper wall 25 just slides within the lip 28 around the edges of the cover 27 and against the gasket 29 on the under surface thereof. Thus, the lips 26 and 28 and the gasket 29 cooperate to form a water tight seal between the cover 27 and the opening in the upper wall 25. The cover 27 may be attached to the remainder of the housing 14 in any desirable fashion, such as by the cam acting clamps 30, hinges, etc. The cam acting clamps 30 illustrated in the various views, are preferred because they draw the cover 27 tightly onto the housing 14 and force the lip 26 into the gasket 29 to provide a water tight seal. The housing 14 also has a plurality of handles 31, two of which are showing, for moving the housing 14 into various positions once it is attached to the automobile 10 and for handling the entire luggage carrier 13 when it is not attached to an automobile.

The frame 15 includes a pair of elongated rails 35 and 36 which, when positioned correctly on the automobile 10, extend longitudinally along either side of the rear deck portion 11 from the tail lights at the extreme rear thereof to approximately the inclined portion 12 of the roof 9. Each of the rails 35 and 36 is constructed of some relatively light material such as wood, and has resilient padded material 37 affixed to the under side thereof to prevent damage to the finish of the automobile 10. Each of the rails 35 and 36 has a U-shaped hook at the rear-most end thereof with some resilient padding on the inner surface which engages the frames of the tail lights to prevent vertical movement of the rails 35 and 36. A cross piece 38 has either end affixed to the rails 35 and 36 adjacent the front ends thereof and prevents horizontal movement of the rails 35 and 36. A belt 39, which may be constructed of any suitable material such as webbing, leather, plastic, etc., is constructed in two pieces with a turn buckle 40 joining ends of the two pieces to provide means for lengthening or shortening the belt during mounting of the luggage carrier 13. Each of the free ends of the belt 39 have a hook 45 attached thereto for engaging the lower edge of the fenders on either side of the automobile 10 to hold the luggage carrier 13 fixedly attached thereto. In attaching the frame 15 to the rear deck portion 11 of the automobile 10, the turn buckle 40 is open to lengthen the belt 39. The rails 35 and 36 are placed in position along either edge of the rear deck portion 11 with the U-shaped members engaged over the tail light frames. The hooks 45 at the ends of the belt 39 are engaged over the lower edges of the rear fenders of the automobile 10, with the end portions of the belt 39 therebetween to protect the finish, as illustrated in FIGURE 7. With the hooks 45 fixedly engaged over the lower edges of the fenders the turn buckle 40 is tightened until the entire frame 15 is fixedly held in position.

Figure 2:
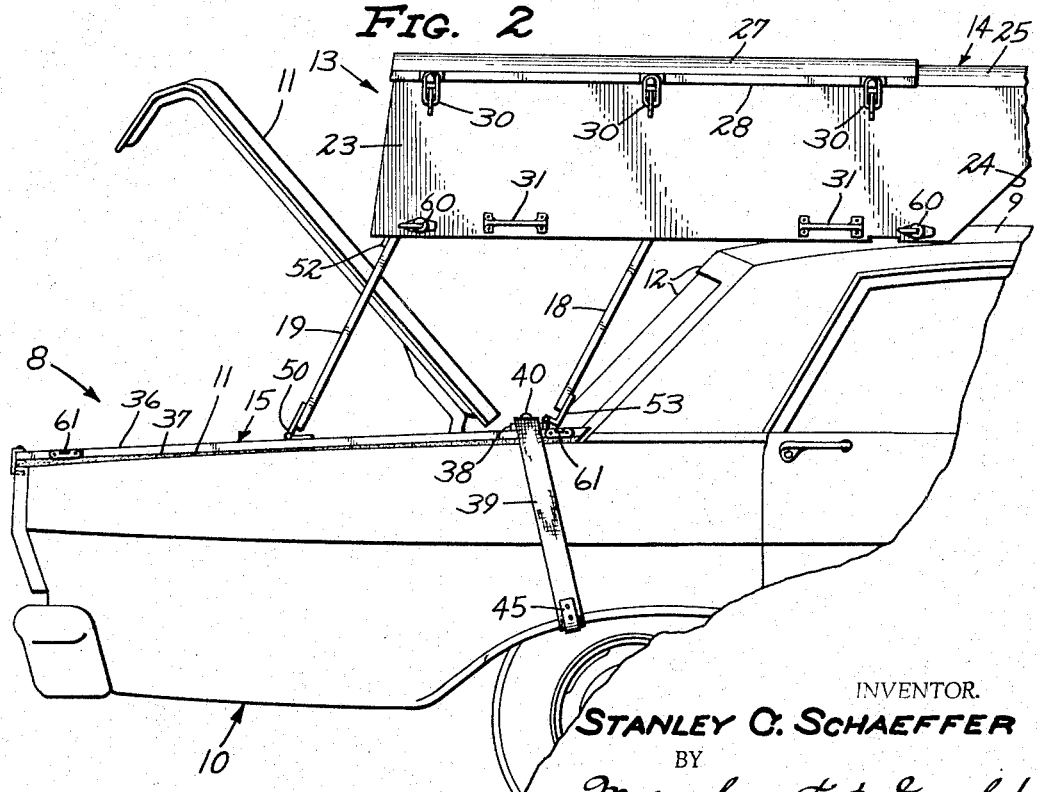
FIGURE 2 is a view similar to FIGURE 1 with the apparatus rotated upwardly to provide access to the trunk below the rear deck portion of the automobile.

The two arms 16 and 19 each have one end pivotally attached to approximately the center of the rails 35 and 36, respectively, by some means such as hinges 50. In the horizontal position the arms 16 and 19 extend rearwardly to a point adjacent the rear wall 21 of the housing 14. A cross piece 51 is adapted to be attached to the lower wall 20 of the housing 14 adjacent the rear wall 21 and the rear-most end of each of the arms 16 and 19 is pivotally attached thereto by some means such as hinges 52. One end of each of the arms 17 and 18 is pivotally attached to the cross piece 38 by some means such as hinges 53. The arms 17 and 18 extend rearwardly from the cross piece 38 parallel to and adjacent the rails 35 and 36, respectively. The rear-most ends of each of the arms 17 and 18 are attached approximately centrally to the under surface of the lower wall 20 of the housing 14 by some means such as hinges 54. Thus, the housing 14 is fixedly attached to the frame 15 by means of the arms 16 through 19 and may be rotated upwardly to the position illustrated in FIGURES 2 and 4 for easy access to the trunk 8. When the arms 16 through 19 are folded downwardly in the horizontal position, the housing 14 is positioned in overlying relationship to the rear deck portion 11 of the automobile 10 and the front wall 24 is parallel with and in juxtaposition to the inclined portion 12 of the roof 9. In this position, which is the normal position for the housing 14 during movement, the housing 14 forms substantially continuous surfaces with the various surfaces of the automobile 10 so there are little or no protrusions to provide wind resistance and unbalance the automobile 10. When the housing 14 is rotated upwardly into the second position, the trunk 8 can be opened to its full extent for easy access thereto. In the second position the housing 14 is swung upwardly and forwardly on the arms 16 through 19 and partially overlies the roof 9. A plurality of cam acting locks 60, two of which are shown, are provided along either lower edge of the side walls 22 and 23 and engage catches 61 affixed to the outer edge of each of the rails 35 and 36 to fixedly lock the housing 14 in the normal position during travel.

The presently described luggage carrier 13 greatly improves over any luggage carriers presently in use since it is substantially larger than any roof top carriers of the like, and does not offer wind resistance or unbalance the automobile during travel. Also, the luggage carrier 13 is low enough to make access there into much easier than any roof top carriers.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A luggage carrier for automobiles and the like comprising:
    (a) an article supporting structure adapted to receive luggage and the like for storage, said structure being adapted to be positioned in overlying relationship to the rear deck portion of an automobile;
    (b) a frame removably attached in a fixed position relative to the rear deck portion of the automobile; and
    (c) a plurality of arms each having one end pivotally attached to said frame and the other end pivotally attached to said structure for allowing movement of said structure between a normal position overlying the rear deck portion and not projecting substantially above the automobile roof line and a second raised position overlying at least a portion of the generally horizontal part of the roof of the automobile.

2. A luggage carrier for automobiles and the like as set forth in claim 1 wherein the article supporting structure includes a housing which substantially overlies the entire rear deck portion of the automobile and the rear inclined portion of the roof thereof.

3. A luggage carrier for automobiles and the like as set forth in claim 2 wherein the plurality of arms are so disposed that the longitudinal axis of the housing remains substantially horizontal throughout movement of the housing from the normal to the second position.

4. A luggage carrier for automobiles and the like as set forth in claim 2 wherein the housing has an opening therein for access to the compartment and a cover removably attached thereover in a substantially water tight relationship.

5. A luggage carrier for automobiles and the like as set forth in claim 2 wherein the frame and the plurality of arms are constructed to provide access to the trunk below the rear deck portion of the automobile when the housing is moved to the second position.

6. A luggage carrier for automobiles and the like comprising:
    (a) a housing having a generally box-like configuration with a compartment therein adapted to receive luggage and the like for storage, said housing having a lower wall adapted to substantially overlie the rear deck portion of an automobile in a generally horizontal relationship and a front wall adapted to lie substantially parallel with the rear downwardly inclined portion of the roof of the automobile and in juxtaposition thereto;
    (b) said housing further having an opening therein for access to the compartment and a cover removable attached thereto in a substantially water tight relationship;
    (c) a frame removably attached in a fixed position relative to the rear deck portion of the automobile;
    (d) a plurality of arms each having one end pivotally attached to said frame and the other end pivotally attached to said housing for allowing movement of said housing between a normal position overlying the rear deck portion and a second position at least partially overlying the roof; and
    (e) said frame and arms being further constructed to maintain the lower wall of said housing generally horizontal as said housing is moved from the normal to the second position and to allow access to the trunk below the rear deck portion when said housing is in the second position.

References Cited

UNITED STATES PATENTS

| | | |
|---|---|---|
| 3,058,636 | 10/1962 | Bilbeisi. |
| 3,103,289 | 9/1963 | Clary _____ 214—450 |
| 3,191,829 | 6/1965 | Davis. |
| 3,228,575 | 1/1966 | Peterson. |

FOREIGN PATENTS 658,618   2/1963   Canada.

GERALD M. FORLENZA, *Primary Examiner.*

R. J. SPAR, *Assistant Examiner.*